United States Patent
Larsson et al.

(10) Patent No.: US 9,124,412 B2
(45) Date of Patent: Sep. 1, 2015

(54) METHOD AND ARRANGEMENT FOR RECONFIGURING MAPPING OF CARRIER INDICATOR FIELD TO COMPONENT CARRIER

(75) Inventors: Daniel Larsson, Solna (SE); Robert Baldemair, Solna (SE); Dirk Gerstenberger, Stockholm (SE); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 326 days.

(21) Appl. No.: 12/886,031

(22) Filed: Sep. 20, 2010

(65) Prior Publication Data

US 2011/0141985 A1    Jun. 16, 2011

Related U.S. Application Data

(60) Provisional application No. 61/286,138, filed on Dec. 14, 2009.

(51) Int. Cl.
*H04L 5/00* (2006.01)

(52) U.S. Cl.
CPC ............ *H04L 5/0096* (2013.01); *H04L 5/0064* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 6,002,680 A * | 12/1999 | Sierens et al. | 370/344 |
| 6,944,138 B1 * | 9/2005 | Song | 370/310.1 |
| 2004/0235485 A1 * | 11/2004 | Tanaka | 455/447 |
| 2009/0257421 A1 * | 10/2009 | Nakashima et al. | 370/345 |
| 2011/0064042 A1 * | 3/2011 | Kim et al. | 370/329 |
| 2011/0134877 A1 * | 6/2011 | Noh et al. | 370/329 |
| 2011/0194514 A1 * | 8/2011 | Lee et al. | 370/329 |

(Continued)

FOREIGN PATENT DOCUMENTS

| | | |
|---|---|---|
| RU | 2234192 C2 | 8/2004 |
| WO | 0201763 A1 | 1/2002 |

(Continued)

OTHER PUBLICATIONS

3rd Generation Partnership Project, Philips, "PDCCH Design and Monitoring Set for Carrier Aggregation," 3GPP TSG RAN WG1 #59, R1-094990, Nov. 9-13, 2009, Jeju, South Korea.

(Continued)

*Primary Examiner* — Chirag Shah
*Assistant Examiner* — Joshua Smith
(74) *Attorney, Agent, or Firm* — Coats and Bennett, PLLC

(57) ABSTRACT

A method and an arrangement in a radio network node for reconfiguring mappings from Carrier Indicator Field-values to component carriers are provided. Each CIF-value is mapped to a respective component carrier comprising a respective shared data channel. Each respective shared data channel corresponds to at least one downlink control channel carrying said each CIF-value. The radio network node reconfigures mappings from CIF-values to component carriers, while at least one mapping of CIF-value to component carrier is maintained. The component carrier of said at least one mapping from CIF-value to component carrier comprises said at least one downlink control channel and a shared data channel corresponding to said at least one downlink control channel. The radio network node sends at least one of the reconfigured mappings from CIF-values to component carriers to the user equipment.

22 Claims, 6 Drawing Sheets

(56) References Cited

U.S. PATENT DOCUMENTS

| | | | | |
|---|---|---|---|---|
| 2011/0267957 A1* | 11/2011 | Du et al. | | 370/329 |
| 2011/0310749 A1* | 12/2011 | Unruh | | 370/329 |

FOREIGN PATENT DOCUMENTS

| | | |
|---|---|---|
| WO | 2005122627 A1 | 12/2005 |
| WO | 2009012272 A2 | 1/2009 |

OTHER PUBLICATIONS

3rd Generation Partnership Project, Nokia et al., "Carrier Aggregation Configuration and DL/UL Linkage," 3GPP TSG RAN WG1 #59, R1-094642, Nov. 9-13, 2009, Jeju, South Korea.

3rd Generation Partnership Project, Catt, "Carrier Activation and De-Activation," 3GPP TSG-RAN WG2 #68, R2-096502, Nov. 9-13, 2009, Jeju, South Korea.

3rd Generation Partnership Project, Nokia Siemens Networks et al., "Autonomous CC Selelction for Heterogeneous Environments," 3GPP TSG RAN WG1 #59, R1-094659, Nov. 9-13, 2009, Jeju, South Korea.

3rd Generation Partnership Project, Nokia Corp et al., "Basic CC Configuration in Carrier Aggregation," 3GPP TSG-RAN WG2 #68, R2-096812, Nov. 9-13, 2009, Jeju, South Korea.

3rd Generation Partnership Project, Catt et al., "Design of DL Control Channel for LTE-A with Carrier Aggregation," 3GPP TSG RAN WG1 #57-bis, R1-092785, Jun. 29-Jul. 3, 2009, Los Angeles, USA.

Alcatel-Lucent, "Component carrier indication for bandwidth extension in LTE-A", 3GPP TSG-RAN WG1 #58, Shenshen, China, R1-093362, Aug. 24-28, 2009.

Huawei. "Issues on Cross-Carrier PDCCH Indication for Carrier Aggregation." 3GPP TSG RAN WG1 meeting #58, R1-093047, Shenzhen, China, Aug. 24-28, 2009, pp. 1-8.

Qualcomm Europe. "Interpreting the Carrier Indicator Field." 3GPP TSG RAN WG1 #58bis, R1-094206, Miyazaki, Japan, Oct. 12-16, 2009, pp. 1-3.

* cited by examiner

METHOD AND ARRANGEMENT FOR RECONFIGURING MAPPING OF CARRIER INDICATOR FIELD TO COMPONENT CARRIER

RELATED APPLICATION

This application claims priority under 35 U.S.C. §119(e) to U.S. Provisional Patent Application Ser. No. 61/286,138, filed Dec. 14, 2009, the entire contents of which is incorporated herein by reference.

TECHNICAL FIELD

The present disclosure relates to a method and an arrangement in a multi-carrier radio communication system. In particular, the present disclosure relates to a method and an arrangement in a radio network node for reconfiguring mappings from Carrier Indicator Field-values to component carriers.

BACKGROUND

LTE (Long Term Evolution) uses OFDM (Orthogonal Frequency Division Multiplexing) in the downlink and DFT-spread OFDM (Discrete Fourier Transform spread Orthogonal Frequency Division Multiplexing) in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized subframes of length $T_{subframe}=1$ ms as seen in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, in that in each subframe (or transmission time interval, TTI) the base station transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 3.

To transmit data in the uplink the mobile terminal has to have been first assigned an uplink resource for data transmission, on the Physical Uplink Shared Channel (PUSCH). In contrast to a data assignment in downlink, in uplink the assignment of resource blocks must always be consecutive in frequency, to retain the single carrier property of the uplink as illustrated in FIG. 4.

The LTE Rel-8 standard has recently been standardized, supporting bandwidths up to 20 MHz. However, in order to meet the upcoming IMT-Advanced requirements, 3GPP has initiated work on LTE-Advanced. One of the parts of LTE-Advanced is to support bandwidths larger than 20 MHz. One important requirement on LTE-Advanced is to assure backward compatibility with LTE Rel-8. This should also include spectrum compatibility. That would imply that an LTE-Advanced carrier, wider than 20 MHz, should appear as a number of LTE carriers to an LTE Rel-8 terminal. Each such carrier can be referred to as a component carrier (CC). In particular for early LTE-Advanced deployments it can be expected that there will be a smaller number of LTE-Advanced-capable terminals compared to many LTE legacy terminals. Therefore, it is necessary to assure an efficient use of a wide carrier also for legacy terminals, i.e., that it is possible to implement carriers where legacy terminals can be scheduled in all parts of the wideband LTE-Advanced carrier. The straightforward way to obtain this would be by means of carrier aggregation. Carrier aggregation implies that an LTE-Advanced terminal can receive multiple component carriers, where the component carriers have, or at least the possibility to have, the same structure as a Rel-8 carrier. Carrier aggregation is illustrated in FIG. 5.

The number of aggregated component carriers as well as the bandwidth of the individual component carrier may be different for uplink and downlink. A symmetric configuration refers to the case where the number of component carriers in downlink and uplink is the same, whereas an asymmetric configuration refers to the case that the number of component carriers is different. It is important to note that the number of component carriers configured in a cell may be different from the number of component carriers seen by a terminal: A terminal may, for example, support more downlink component carriers than uplink component carriers, even though the cell is configured with the same number of uplink and downlink component carriers.

Scheduling of the component carriers is done on the Physical Downlink Control Channel (PDCCH) via downlink assignments. Uplink grants are also signaled via PDCCH. Control information on the PDCCH is formatted as a Downlink Control Information (DCI) message. DCI messages for downlink assignments contain among others resource block assignment, modulation and coding scheme related parameters, hybrid-ARQ redundancy version, etc. In addition to those parameters that relate to the actual downlink transmission most DCI formats for downlink assignments also contain a bit field for Transmit Power Control (TPC) commands. These TPC commands are used to control the uplink power control behavior of the corresponding PUCCH that is used to transmit the hybrid-ARQ feedback.

The design of PDCCH in LTE Rel-10 follows very much that one in Rel-8/9. Assignments and grants of each component carrier are separately encoded and transmitted within a separate PDCCH. Main motivation for choosing separately encoded PDCCH over a jointly encoded PDCCH—here DCI messages from multiple component carriers would be lumped together into one entity, jointly encoded and transmitted in a single PDCCH—was simplicity.

In LTE Rel-10, the PDCCH is extended to include a Carrier Indicator Field (CIF), which is not present in LTE Rel-8/9. The CIF may consist of three bits attached to the DCI message which points to that component carrier the corresponding shared channel is located at. For a downlink assignment the CIF points to the component carrier carrying the PDSCH whereas for an uplink grant the three bits are used to address the component carrier conveying Physical Uplink Shared Channel (PUSCH). For simplicity this field is always three bits.

If CIF is configured, every downlink assignment and uplink grant contains the CIF bits, even if the assignment addresses PDSCH within the component carrier (or PUSCH within the linked uplink component carrier for uplink grants). With no CIF configured, the carrier aggregation looks like multiple parallel Rel-8/9 carriers, see FIG. 7. FIG. 8 shows the relation between PDCCH and PDSCH with configured CIF. A terminal configured with more uplink component carriers than downlink component carriers always requires an uplink grant with CIF.

The mapping of the CIF to component carriers could be done according to one of two different possibilities:
- cell-specific mapping, i.e., the same mapping from CIF value to component carrier number is used by all user equipments (UEs) in the cell. The mapping could either be given according to rules or tables in the upcoming Rel-10 specifications or be signaled as part of the system information in the cell. With a cell-specific approach, the mapping is expected to be fixed or changed very infrequently.
- UE-specific mapping, i.e. each user equipment (UE) has its own mapping from CIF to component carrier number. In this case, the CIF-to-component-carrier mapping is signaled as part of the UE-specific configuration information. Changing the mapping can, in this alternative, be more frequent than in the cell-specific alternative.

Over time the user equipment will have the possibility to receive or transmit data on different component carriers, but not necessarily on all component carriers that a radio network node, such as an eNB, transmits in its cell(s). If the user equipment were required to receive all component carriers transmitted by the radio network node, this would result in short battery time and more memory consumption, for example. Furthermore, the radio network node has also the possibility to turn off component carriers, e.g., to enable power saving.

If UE-specific CIF-to-CC mapping is used, a problem will occur when the mapping from CIF-values to component carriers is updated. During updating of the mapping, the radio network node sends the reconfigured mappings to the user equipment and the network cannot communicate with the user equipment. This may lead to lost calls and degraded performance.

SUMMARY

An object may be to improve performance of connection to user equipments during updating of mapping from CIF-values to component carrier.

According to an aspect, the object is achieved by a method in a radio network node for reconfiguring mappings from Carrier Indicator Field-values, referred to as "CIF-values", to component carriers. Each CIF-value is mapped to a respective component carrier comprising a respective shared data channel. Each respective shared data channel corresponds to at least one downlink control channel carrying said each CIF-value. The component carriers are managed by the radio network node. The radio network node and the user equipment are comprised in a multi-carrier radio communication system. In an initial step, the radio network node reconfigures mappings from CIF-values to component carriers, while at least one mapping of CIF-value to component carrier is maintained. The component carrier of said at least one mapping from CIF-value to component carrier comprises said at least one downlink control channel and a shared data channel corresponding to said at least one downlink control channel. Further, the radio network node sends at least one of the reconfigured mappings from CIF-values to component carriers to the user equipment.

According to another aspect, the object is achieved by an arrangement in a radio network node for reconfiguring mappings from Carrier Indicator Field-values to component carriers. Each CIF-value is mapped to a respective component carrier comprising a respective shared data channel. Each respective shared data channel corresponds to at least one downlink control channel carrying said each CIF-value. The component carriers are managed by the radio network node. The radio network node and the user equipment are comprised in a multi-carrier radio communication system. The arrangement may comprise a reconfiguring circuit configured to reconfigure mappings from CIF-values to component carriers, while at least one mapping of CIF-value to component carrier is maintained. The component carrier of said at least one mapping from CIF-value to component carrier comprises said at least one downlink control channel and a shared data channel corresponding to said at least one downlink control channel. The arrangement may further comprise a transceiver configured to send at least one of the reconfigured mappings from CIF-values to component carriers to the user equipment.

Thanks to the fact that the mapping of CIF-value to component carrier is sent to the user equipment while at least one mapping of CIF-value to component carrier is maintained, the user equipment may continue to transmit on the component carrier corresponding to said at least one mapping of CIF-value to component carrier. As a result, improved performance of connection to the user equipment during updating of mapping from CIF-value to component carrier is achieved.

Expressed differently, mapping of one CIF-value to one component carrier is fixed, i.e., not changed during reconfiguration (or determination) of the CIF-CC-mapping. In this manner, there will be a component carrier available for transmission even during updating of the mapping from CIF-value to component carrier. As a result, a user equipment may transmit/receive continuously by use of the component carrier associated to the CIF-value whose interpretation is kept even though the CIF-CC-mapping is updated for other CIF-values.

An advantage is that the number of lost calls/connections during updating of the CIF-CC-mapping in the user equipment may be reduced. Moreover, degraded connection performance due to updating of mapping from CIF-values to component carriers may be avoided.

Further features of, and advantages with, embodiments of the present invention will become apparent when studying the appended claims and the following description. It is to be understood that different features of embodiments according to the present invention may be combined to create embodiments other than those described in the following, without departing from the scope of the present invention, which is defined by the appended claims.

BRIEF DESCRIPTION OF THE DRAWINGS

The various aspects of the embodiments disclosed herein, including its particular features and advantages, will be readily understood from the following detailed description and the accompanying drawings, in which.

DETAILED DESCRIPTION

Figure 1:
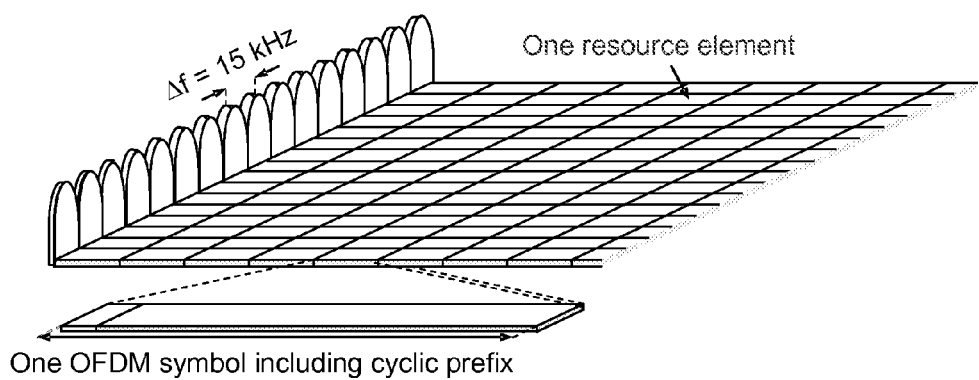
FIG. 1 illustrates schematically an LTE downlink physical resource.
Figure 2:
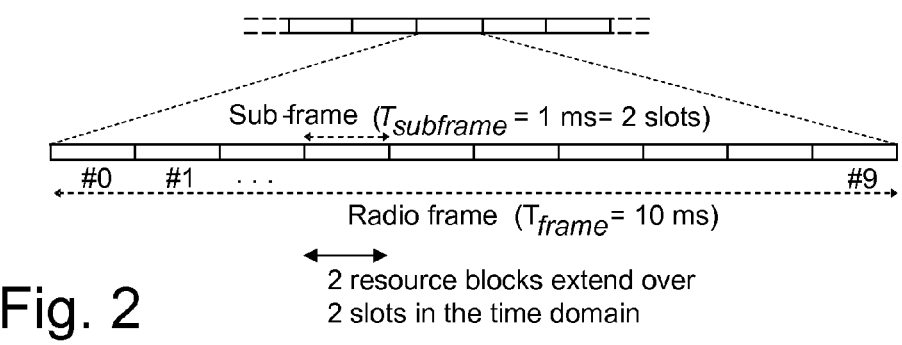
FIG. 2 illustrates schematically an LTE time-domain structure.
Figure 3:
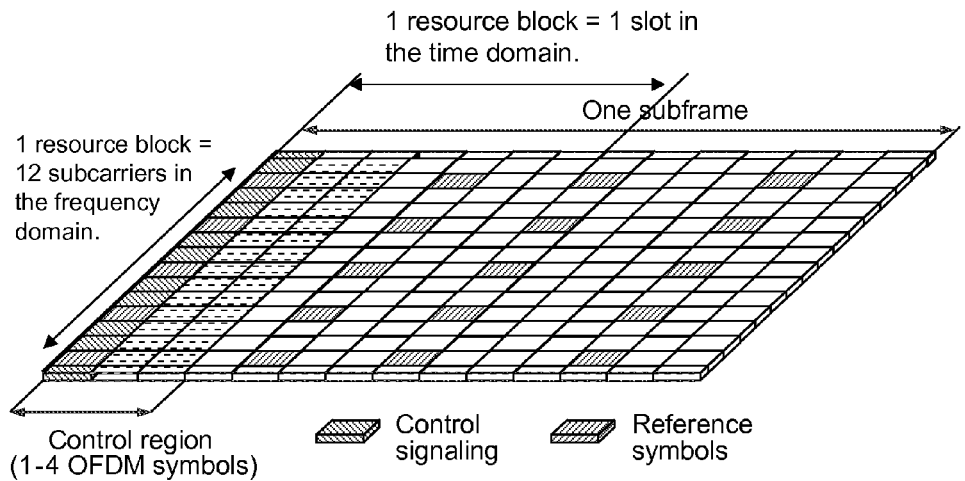
FIG. 3 illustrates schematically a Downlink subframe.
Figure 4:
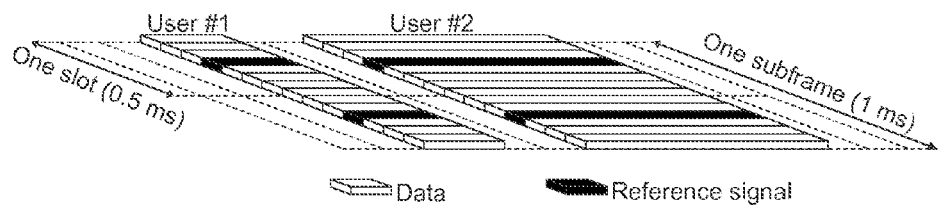
FIG. 4 illustrates schematically a PUSCH resource assignment.

Throughout the following description similar reference numerals have been used to denote similar elements, parts, nodes, systems, items or features, when applicable.

Figure 7:
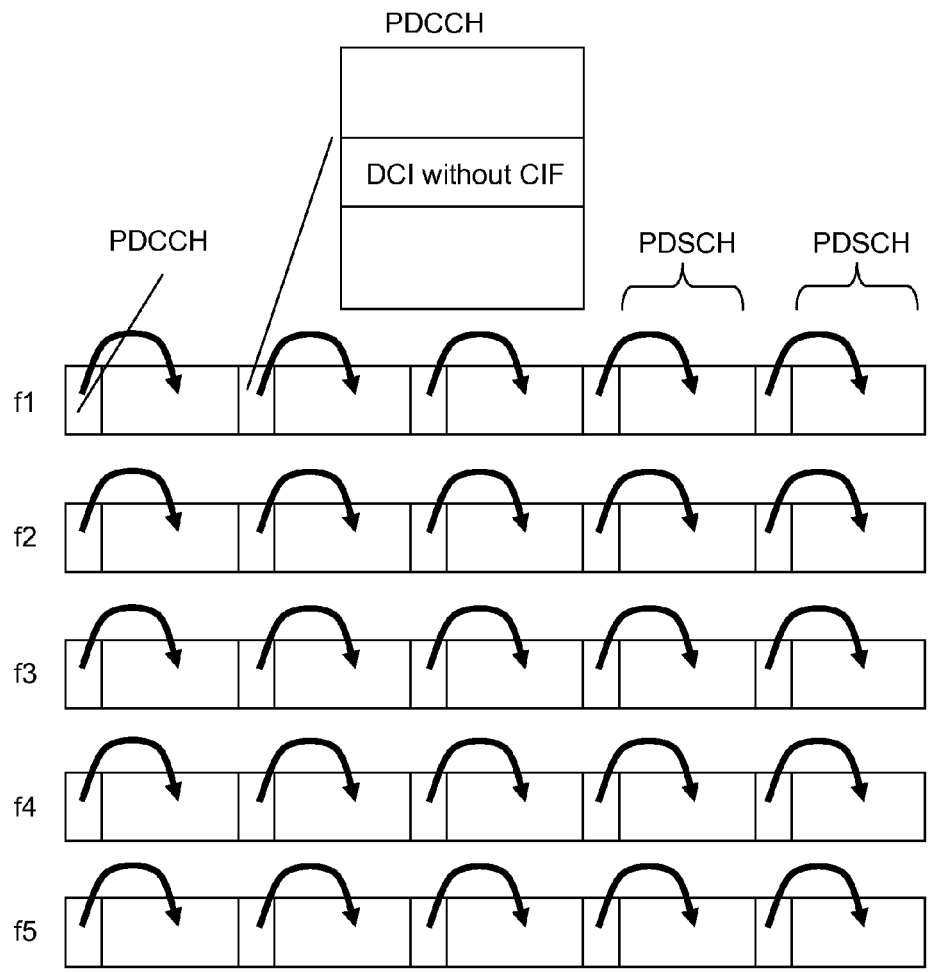
FIG. 7 shows five exemplifying component carriers, in which no CIF is configured in the DCI message of the downlink control channel.
Figure 8:
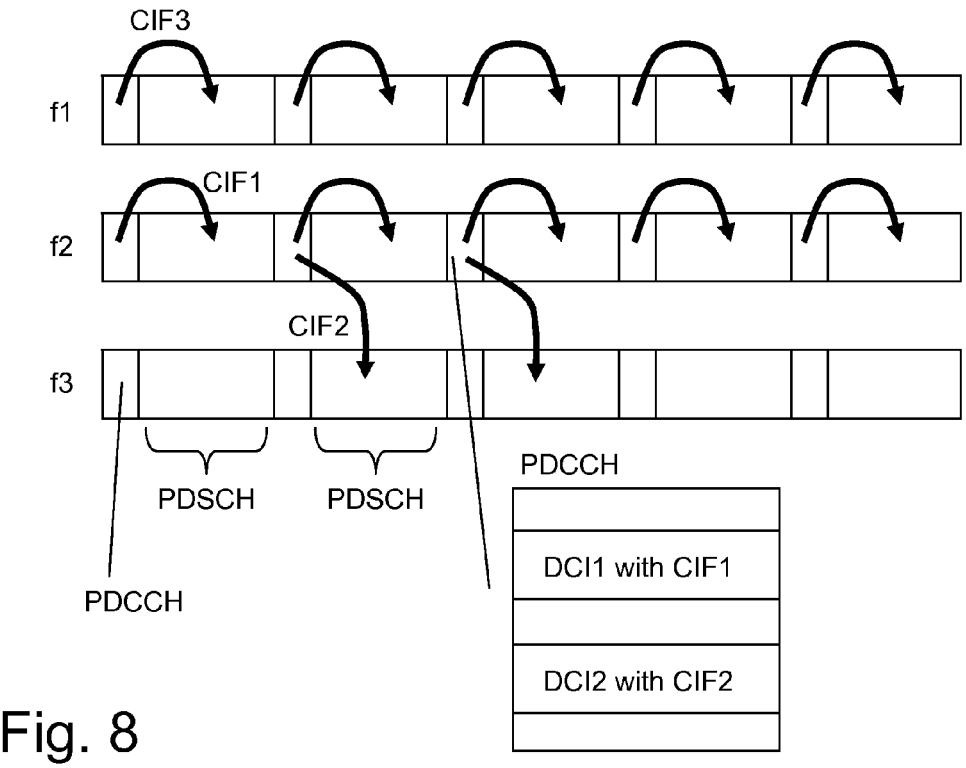
FIG. 8 shows three exemplifying component carriers, in which CIF2 is mapped to component carrier f3.
Figure 9:
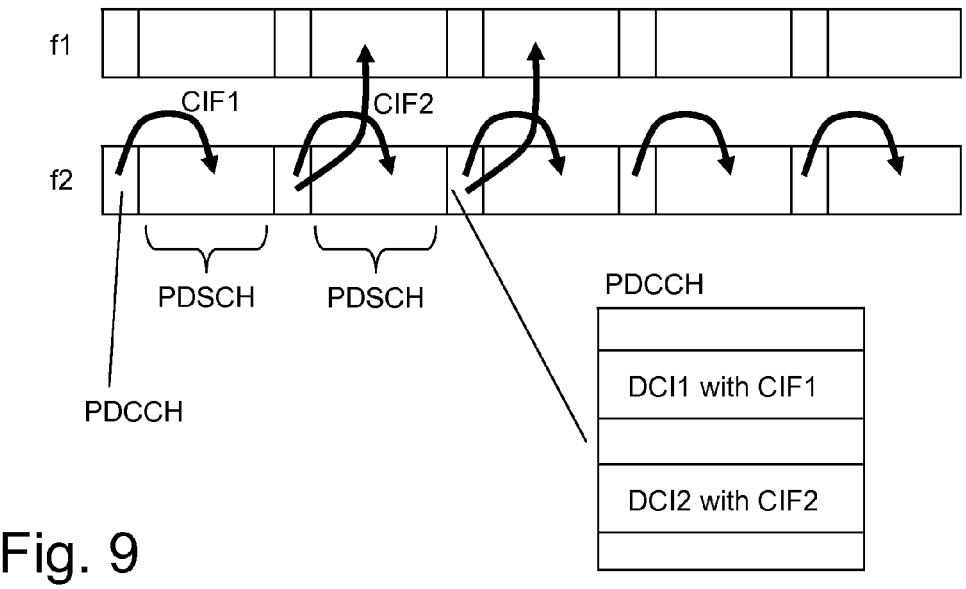
FIG. 9 shows two exemplifying component carriers, in which CIF2 is mapped to component carrier f1.

In FIGS. 7, 8 and 9, there are shown different examples of component carriers with CIF enabled and with CIF disabled. In FIG. 7, the CIF is disabled, whereas in FIGS. 8 and 9, the CIF is enabled. Moreover, FIG. 8 shows a configuration, where the CIF-value to component carrier mapping is different from the CIF-value to component carrier mapping shown by the configuration depicted in FIG. 9.

Figure 6:
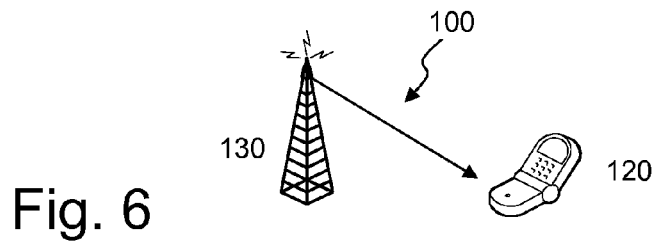
FIG. 6 shows a schematic overview of an exemplifying radio communication system in which the present solution may be implemented.

FIG. 6 shows a schematic overview of an exemplifying multi-carrier radio communication system 100, in which embodiments may be implemented. The multi-carrier radio communication system 100 comprises a radio network node 130 and a user equipment 120. The arrow indicates that the user equipment 120 may exchange information with the radio network node 130 using, for example, a downlink control channel such as PDCCH, and a shared data channel such as PDSCH or PUSCH.

Figure 5:
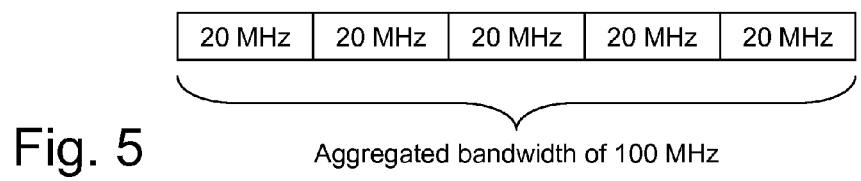
FIG. 5 illustrates carrier aggregation.

FIG. 7 shows five exemplifying component carriers f1, f2, f3, f4, f5, in which no CIF is configured in the DCI message of the downlink control channel. As shown in FIG. 5, an radio communication system, such as LTE-Advance, may use an aggregated carrier, comprising five component carrier of 20 MHz each. In FIG. 7, it may be seen that each component carrier has its own separately encoded PDCCH. In the enlarged view of the PDCCH, it is shown that the Downlink Control Information (DCI) message does not include a CIF-value. Since no CIF is used, PDCCH points to PDSCH allocated on the same component carrier as indicated by the arrows.

FIG. 8 shows three exemplifying component carriers f1, f2, f3, in which CIF2 is mapped to component carrier f3. In FIG. 8, the DCI message, as shown by the enlarged view, comprises a CIF-value. Hence, CIF is enabled. Downlink assignments transmitted in one component carrier may point to PDSCH within another component carrier. In this case, the CIF-value of PDCCH of component carrier f2 cross-schedules to a PDSCH of a component carrier f3. See arrows between component carrier f2 and component carrier f3.

It may be noted that mapping from CIF-value to component carrier may be realized in the form of a table or matrix, where for example a row comprising one CIF-value and one component carrier indicates that this particular CIF-value is mapped to the component carrier on that row. Hence, one or more pairs, wherein each pair comprises one CIF-value and one corresponding component carrier, are formed to express the mapping from CIF-values to component carriers. Thus, one mapping refers to one such pair comprising a CIF-value and a component carrier (or rather component carrier number for indicating a component carrier).

In FIG. 9, the CIF-values of the situation in FIG. 8 have been reconfigured. The radio network node 130 has also decided to switch off (shut down) component carrier f3. Now CIF-value CIF2 is mapped to a component carrier f1 as indicated by the arrows. In FIG. 8, CIF-value CIF2 was mapped to component carrier f3. Notably, CIF-value CIF1 is kept, i.e. points to component carrier f2 in both FIGS. 8 and 9, such that this CIF-value and the respective component carrier f2 may be used by the user equipment 120 during updating of mappings from CIF-value to component carrier.

Figure 10:
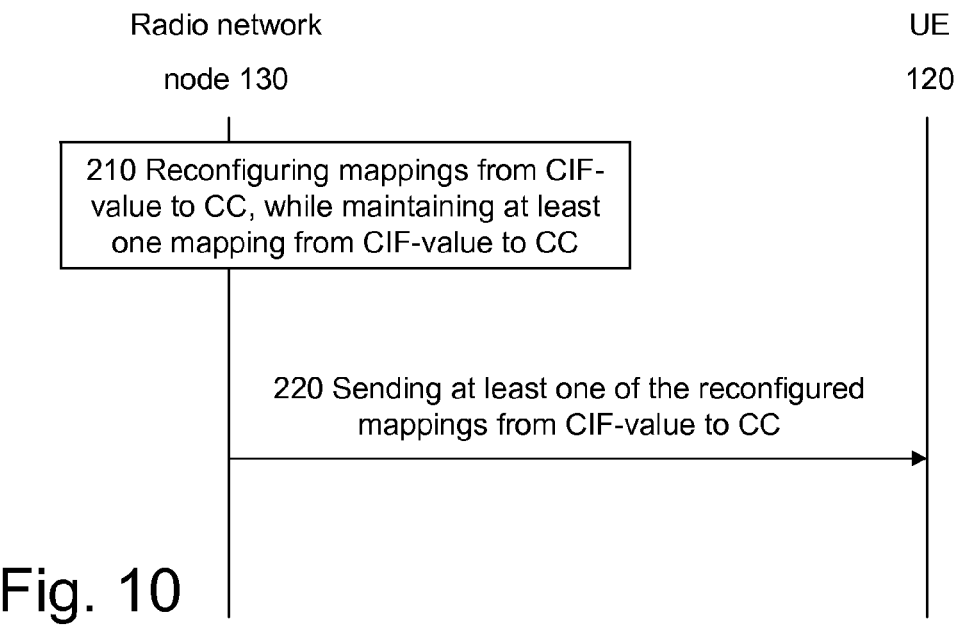
FIG. 10 shows a schematic, combined signalling and flow chart of an embodiment of a method in the radio communication system according to FIG. 6 for reconfiguring mappings from Carrier Indicator Field-values to component carriers.

In FIG. 10, there is shown a schematic, combined signalling and flow chart of an embodiment of a method in the radio communication system 100 according to FIG. 6 for reconfiguring mappings from Carrier Indicator Field-values to component carriers. Each CIF-value is mapped to a respective component carrier comprising a respective shared data channel. Each respective shared data channel corresponds to at least one downlink control channel carrying (or comprising) said each CIF-value. The component carriers are managed by the radio network node 130. The radio network node 130 and the user equipment 120 are comprised in a multi-carrier radio communication system 100. The following steps may be performed. Notably, in some embodiments of the method the order of the steps may differ from what is indicated below.

210: The radio network node 130 reconfigures mappings from CIF-values to component carriers, while maintaining at least one mapping of CIF-value to component carrier. The component carrier of said at least one mapping from CIF-value to component carrier comprises said at least one downlink control channel and a shared data channel corresponding to said at least one downlink control channel.

220: The user equipment 120 receives at least one of the reconfigured mappings from CIF-values to component carriers from radio network node 130.

The present solution enables the radio network node 130, such as an eNB, to always have the possibility to schedule data on the component carrier that carries PDCCH and PDSCH (or the anchor carrier, also referred to as primary cell). Hence, the radio network node 130 may schedule the user equipment even when it is reconfiguring all its other CIF-to-component carrier mappings. In some embodiments, this also enables lower signaling overhead on the Radio Resource Control protocol and avoids drop of communication between the user equipment 120 and the radio network node 130 during updating of mapping. In a scenario where the user equipment has initiated hand-over directly before updating of mapping, the user equipment may need to transmit with high power in order to keep connection. In such a scenario, embodiments avoid extensive user equipment battery consumption and/or unnecessary user equipment memory usage.

Figure 11:
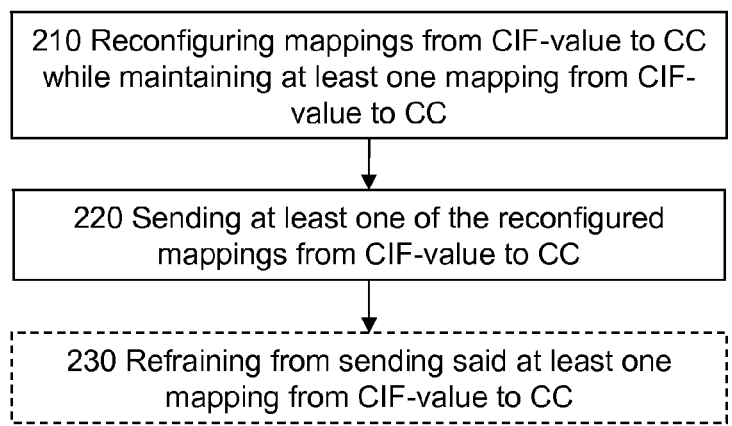
FIG. 11 shows a schematic flow chart of an embodiment of the method in the radio network node for reconfiguring mappings from Carrier Indicator Field-values to component carriers.

FIG. 11 illustrates an exemplifying method in a radio network node 130 for reconfiguring mappings from Carrier Indicator Field-values to component carriers. The flow chart of FIG. 11 corresponds to the combined signalling and flow chart of FIG. 10. Where applicable the same reference numerals have been used. Each CIF-value is mapped to a respective component carrier comprising a respective shared data channel. Each respective shared data channel corresponds to at least one downlink control channel carrying (or comprising) said each CIF-value. The component carriers are managed by the radio network node 130. The radio network node 130 and the user equipment 120 are comprised in a multi-carrier radio communication system 100. The following steps may be performed. Notably, in some embodiments of the method the order of the steps may differ from what is indicated below.

210 The radio network node 130 reconfigures mappings from CIF-values to component carriers, while maintaining at least one mapping of CIF-value to component carrier. The component carrier of said at least one mapping from CIF-value to component carrier comprises said at least one downlink control channel and a shared data channel corresponding to said at least one downlink control channel.

220 The radio network node 130 sends at least one of the reconfigured mappings from CIF-values to component carriers to the user equipment 120.

In some embodiments of the method in the network node 130, wherein the component carrier of said at least one mapping from CIF-value to component carrier corresponds to a primary cell, wherein the primary cell is one of the component carriers managed by the radio network node 130. An advantage may be that, from a user equipment perspective, channel quality may be better on the primary cell as compared to other cells.

In some embodiments of the method in the network node 130, the CIF-value of said at least one mapping from CIF-value to component carrier is equal to zero.

In some embodiments of the method in the network node 130, the sending 230 of the configured mapping further comprises refraining 230 from sending said at least one mapping from CIF-value to component carrier to the user equipment 120. As a consequence, said at least one mapping from CIF-value to component carrier may need to be predetermined. An advantage may be that less information needs to be sent from the radio network node 130 to the user equipment 120.

In some embodiments of the method in the network node 130, the control channel is PDCCH and the shared data channel is PDSCH or PUSCH in case the multi-carrier radio communication system is an LTE system. Hence, it may be noted that embodiments presented herein may be applicable to both downlink assignments and uplink grants.

In some embodiments of the method in the network node 130, the step of sending at least some of the reconfigured mappings is performed using Radio Resource Control protocol, sometimes referred to as RRC-protocol.

Figure 12:
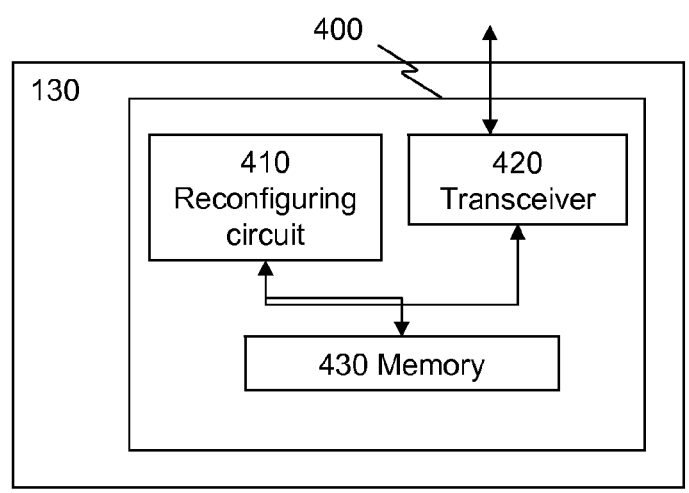
FIG. 12 shows a schematic block diagram of an embodiment of the arrangement in the radio network node.

Now referring to FIG. 12, there is illustrated an arrangement 400 in the radio network node 130 configured to perform the method described above. The arrangement 400 is, hence, configured to reconfigure mappings from Carrier Indicator Field-values to component carriers. Each CIF-value is mapped to a respective component carrier comprising a respective shared data channel. Each respective shared data channel corresponds to at least one downlink control channel carrying said each CIF-value. The component carriers are managed by the radio network node 130. The radio network node 130 and the user equipment 120 are comprised in a multi-carrier radio communication system 100. The arrangement 400 may comprise a reconfiguring circuit 410 configured to reconfigure mappings from CIF-values to component carriers, while maintaining at least one mapping of CIF-value to component carrier. The reconfiguring circuit 410 may be a processing circuit/unit, a processor, an application specific integrated circuit (ASIC), a field-programmable gate array (FPGA) or the like. The component carrier of said at least one mapping from CIF-value to component carrier comprises said at least one downlink control channel and a shared data channel corresponding to said at least one downlink control channel. The arrangement 400 further comprises a transceiver 420 configured to send at least one of the reconfigured mappings from CIF-values to component carriers to the user equipment 120. Moreover, the arrangement 400 may comprise a memory 430 for storing software to be executed by, for example, the processor. The software may comprise instructions to enable the processor to perform the method described above.

In some embodiments of the arrangement 400 in the radio network node 130, the transceiver 420 may be a sending/receiving unit or may comprise a transmitter and/or a receiver as appropriate.

In some embodiment of the arrangement 400 in the radio network node 130, wherein the component carrier of said at least one mapping from CIF-value to component carrier corresponds to a primary cell, wherein the primary cell is one of the component carriers managed by the radio network node 130. An advantage may be that, from a user equipment perspective, channel quality may be better on the primary cell as compared to other cells.

In some embodiment of the arrangement 400 in the radio network node 130, the CIF-value of said at least one mapping from CIF-value to component carrier is equal to zero.

In some embodiment of the arrangement 400 in the radio network node 130, the transceiver 420 further is configured to refrain from sending said at least one mapping from CIF-value to component carrier to the user equipment 120. As a consequence, said at least one mapping from CIF-value to component carrier may need to be predetermined. An advantage may be that less information needs to be sent from the radio network node 130 to the user equipment 120.

In some embodiment of the arrangement 400 in the radio network node 130, the control channel is PDCCH and the shared data channel is PDSCH or PUSCH In some embodiment of the arrangement 400 in the radio network node 130, the transceiver 420 may further be configured to use Radio Resource Control protocol when sending at least some of the reconfigured mappings to the user equipment 120.

According to some embodiments, the mapping of one of the CIF values should be fixed, so that is not possible to reconfigure the component carrier that carries both the PDCCH and PDSCH (e.g. component carrier f2 in FIGS. 8 and 9).

In an example of an embodiment, the interpretation of one CIF value is fixed by the specification, i.e. not reconfigurable, to point to the same component carrier that the PDCCH is transmitted upon. The fixed CIF value may be either defined by the standard, e.g. always CIF=0, or may be configured to the same value for all UEs through RRC signaling (broadcast or dedicated signaling). In one example this component carrier would correspond to a value of CIF=0. Hence, even during the reconfiguration period, one CIF value may be used without ambiguity and hence there is always a possibility for the network to communicate with the terminal.

In an example of an embodiment, the interpretation of one CIF value is fixed to point to a predefined component carrier, e.g. the so-called anchor carrier. The anchor carrier is a component carrier which the UE always has to monitor (subject to any Discontinuous Transmission cycle, abbreviated as DTX cycle), e.g. for receiving system information. The anchor carrier may also be referred to as the primary cell according to 3GPP-terminology.

Even though a number of embodiments of the present invention have been described, many different alterations, modifications and the like will become apparent for those skilled in the art. The described embodiments are therefore not intended to limit the scope of the invention, which is defined by the appended claims.

The invention claimed is:

1. A method in a radio network node for reconfiguring mappings from Carrier Indicator Field-values, referred to as CIF-values, to component carriers, wherein each CIF-value is mapped to a respective component carrier comprising a respective shared data channel, wherein a value of each CIF-value with a reconfigured mapping does not change when reconfiguring mappings from CIF-values to component carriers, wherein the method comprises:

reconfiguring mappings from CIF-values to component carriers, while maintaining at least one mapping of CIF-value to component carrier and maintaining the value of each CIF-value with a reconfigured mapping, wherein each CIF-value is mapped to a respective component carrier comprising a respective shared data channel, wherein each CIF-value identifies the respective component carrier, wherein each respective shared data channel is addressed by at least one downlink control channel carrying said each CIF-value, and the component carriers are managed by the radio network node, wherein the radio network node and the user equipment are comprised in a multi-carrier radio communication system; and sending at least one of the reconfigured mappings from CIF-values to component carriers to the user equipment;

wherein said at least one downlink control channel and a shared data channel addressed by said at least one downlink control channel are transmitted on the component carrier of said at least one mapping that is maintained during reconfiguration.

2. The method of claim 1, wherein the component carrier of said at least one mapping from CIF-value to component carrier corresponds to a primary cell, wherein the primary cell is one of the component carriers managed by the radio network node.

3. The method of claim 1, wherein the CIF-value of said at least one mapping from CIF-value to component carrier is equal to zero.

4. The method of claim 1, wherein sending at least one of the configured mappings further comprises refraining from sending said at least one mapping from CIF-value to component carrier to the user equipment.

5. The method of claim 1, wherein the control channel is PDCCH and the shared data channel is PDSCH or PUSCH.

6. The method of claim 1, wherein the step of sending at least one of the reconfigured mappings is performed using Radio Resource Control protocol.

7. An arrangement in a radio network node for reconfiguring mappings from Carrier Indicator Field-values, referred to as CIF-values, to component carriers, wherein a value of each CIF-value with a reconfigured mapping does not change when reconfiguring mappings from CIF-values to component carriers, wherein the arrangement comprises:

a reconfiguring circuit configured to reconfigure mappings from CIF-values to component carriers, while maintaining at least one mapping of CIF-value to component carrier and maintaining the value of each CIF-value with a reconfigured mapping, wherein each CIF-value is mapped to a respective component carrier comprising a respective shared data channel, wherein each CIF-value identifies the respective component carrier, wherein each respective shared data channel is addressed by at least one downlink control channel carrying said each CIF-value, and the component carriers are managed by the radio network node, wherein the radio network node and the user equipment are comprised in a multi-carrier radio communication system, wherein said at least one downlink control channel and a shared data channel addressed by said at least one downlink control channel are transmitted on the component carrier of said at least one mapping that is maintained during reconfiguration; and a transceiver configured to send at least one of the reconfigured mappings from CIF-values to component carriers to the user equipment.

8. The arrangement of claim 7, wherein the component carrier of said at least one mapping from CIF-value to component carrier corresponds to a primary cell, wherein the primary cell is one of the component carriers managed by the radio network node.

9. The arrangement of claim 7, wherein the CIF-value of said at least one mapping from CIF-value to component carrier is equal to zero.

10. The arrangement of claim 7, wherein the transceiver further is configured to refrain from sending said at least one mapping from CIF-value to component carrier to the user equipment.

11. The arrangement of claim 7, wherein the control channel is PDCCH and the shared data channel is PDSCH or PUSCH.

12. The arrangement of claim 7, wherein the transceiver is configured to use Radio Resource Control protocol when sending at least one of the reconfigured mappings to the user equipment.

13. A method implemented in a User Equipment, UE, for reconfiguring mappings from Carrier Indicator Field-values, referred to as CIF-values, to component carriers, wherein a value of each CIF-value with a reconfigured mapping does not change when reconfiguring mappings from CIF-values to component carriers, wherein the method comprises:

receiving reconfigured mappings from CIF-values to component carriers from a radio network node, wherein the reconfigured mappings include at least one maintained mapping of CIF-value to component carrier and at least one changed mapping of CIF-value to component carrier received on the component carrier and mapping to another component carrier, from the radio network node, wherein the value of each CIF-value with a reconfigured mapping is maintained, wherein each CIF-value is mapped to a respective component carrier comprising a respective shared data channel, wherein each CIF-value identifies the respective component carrier, wherein each respective shared data channel is addressed by at least one downlink control channel carrying said each CIF-value, and the component carriers are managed by the radio network node, wherein the radio network node and the user equipment are comprised in a multi-carrier radio communication system, wherein said at least one downlink control channel and a shared data channel addressed by said at least one downlink control channel are transmitted on the component carrier of said at least one mapping that is maintained during reconfiguration.

14. The method according to claim 13, wherein the at least one maintained mapping of CIF-value to component carrier, which are included in the received reconfigured mappings, corresponds to a primary cell, wherein the primary cell is one of the component carriers which are managed by the radio network node.

15. The method according to claim 13, wherein the CIF-value of the at least one maintained mapping of CIF value to component carrier, which are included in the received reconfigured mappings, is equal to zero.

16. The method according to claim 13, wherein the control channel is PDCCH and the shared data channel is PDSCH or PUSCH.

17. The method according to claim 13, wherein receiving the reconfigured mapping is performed using Radio Resource Control protocol.

18. A User Equipment, UE configured for reconfiguring mappings from Carrier Indicator Field-values, referred to as "CIF-values", to component carriers, wherein a value of each CIF-value with a reconfigured mapping does not change when reconfiguring mappings from CIF-values to component carriers, wherein the UE comprising:
- a receiver circuit configured to receiving reconfigured mappings from CIF-values to component carriers from a radio network node wherein the reconfigured mappings include at least one maintained mapping of CIF-value to component carrier and at least one changed mapping of CIF-value to component carrier received on the component carrier and mapping to another component carrier, from the radio network node, wherein the value of each CIF-value with a reconfigured mapping is maintained, wherein each CIF-value is mapped to a respective component carrier comprising a respective shared data channel, wherein each CIF-value identifies the respective component carrier, wherein each respective shared data channel is addressed by at least one downlink control channel carrying said each CIF-value, and the component carriers are managed by the radio network node, wherein the radio network node and the user equipment are comprised in a multi-carrier radio communication system, wherein said at least one downlink control channel and a shared data channel addressed by said at least one downlink control channel are transmitted on the component carrier of said at least one mapping that is maintained during reconfiguration, and
- a reconfiguring circuit configured to reconfiguring the mappings from CIF-values to component carriers according to the received reconfigured mappings which include at least one maintained mapping of CIF-value to component carrier and at least one changed mapping of CIF-value to component carrier.

19. The UE according to claim 18, wherein the at least one maintained mapping of CIF-value to component carrier, which are included in the received reconfigured mappings received by the receiver circuit, corresponds to a primary cell, wherein the primary cell is one of the component carriers which are managed by the radio network node.

20. The UE according to claim 18, wherein the CIF-value of the at least one maintained mapping of CIF-value to component carrier, which are included in the received reconfigured mappings received by the receiver circuit, is equal to zero.

21. The UE according to claim 18, wherein the control channel is PDCCH and the shared data channel is PDSCH or PUSCH.

22. The UE according to claim 18, wherein the receiver circuit is configured for receiving the reconfigured mapping by using Radio Resource Control protocol.

* * * * *